Aug. 18, 1925.
C. C. FARMER
1,549,759
AUTOMATIC TRAIN CONTROL DEVICE
Filed Sept. 30, 1924
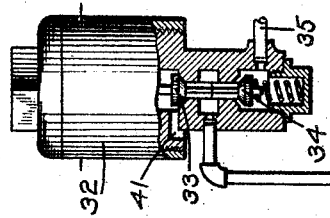
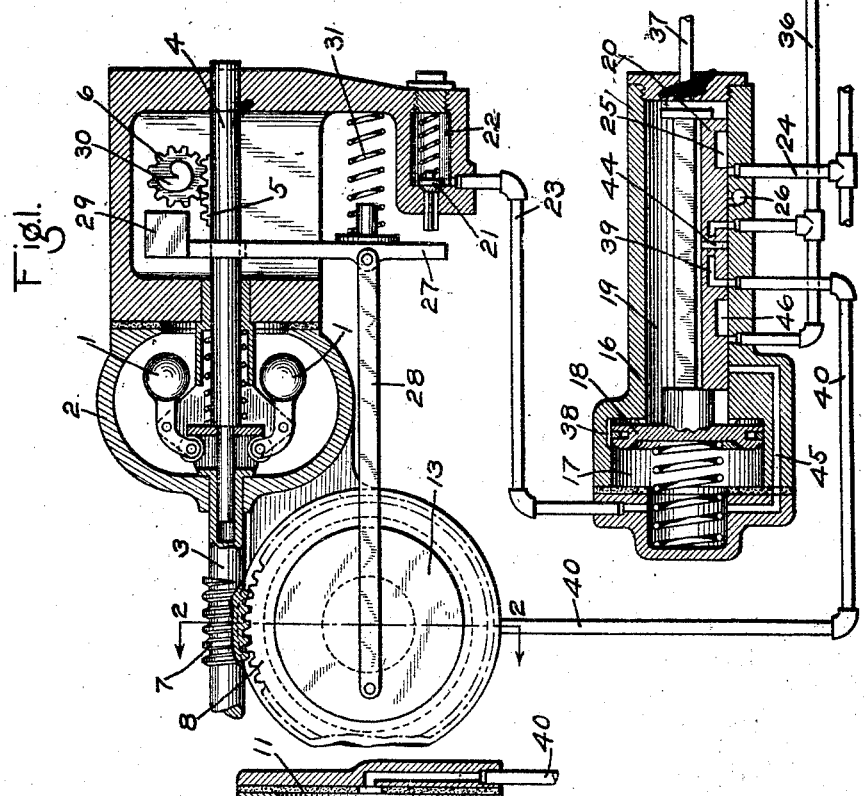
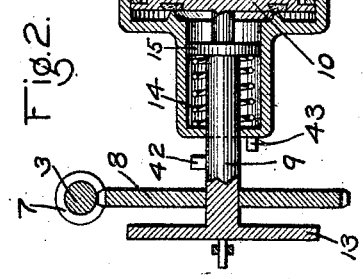
INVENTOR
CLYDE C. FARMER
BY *Wm. M. Cady*
ATTORNEY Patented Aug. 18, 1925.

1,549,759

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMATIC TRAIN-CONTROL DEVICE.

Application filed September 30, 1924. Serial No. 740,741.

*To all whom it may concern:*

Be it known that I, CLYDE C. FARMER, a citizen of the United States, residing at Pittsburgh, in the county of Allegheny and State of Pennsylvania, have invented new and useful Improvements in Automatic Train-Control Devices, of which the following is a specification.

This invention relates to train control apparatus, and has for its principal object to delay the operation of the control apparatus to effect an application of the brakes for a period of time after a restrictive indication has been received.

In the accompanying drawing; Fig. 1 is a diagrammatic view, partly in section, of a train control apparatus embodying my invention; and Fig. 2 a section on the line 2—2 of Fig. 1.

As shown in the drawing, the apparatus may comprise a speed governor having governor balls 1 contained in a casing 2 and adapted to be rotated by a drive shaft 3, said drive shaft being operatively connected up so as to rotate at a speed proportional to the speed of the vehicle. The governor balls 1 act to impart longitudinal movement to a rod 4, in proportion to the increase in the speed of the train and said rod is provided with a rack 5, the teeth of which mesh with a pinion 6, so that the pinion is rotated in accordance with the extent the rod 4 is moved longitudinally and therefore in proportion to the speed of the train.

The drive shaft 3 is provided with a worm 7 which engages the teeth of a worm wheel 8, so that the worm wheel rotates when the drive shaft 3 rotates. The worm wheel 8 is rotatably mounted on the piston rod 9 of a piston 10 and said piston is contained in a piston chamber 11 of a casing 12.

Carried at the outer end of the piston rod 9 is a friction disk 13, adapted upon longitudinal movement of the piston rod 9 to frictionally engage the adjacent face of the wheel 8. A coil spring 14 surrounds a portion of the rod 9 within the casing 12 and acts on a collar 15 secured to said rod, so that the spring tends to shift the rod 9 to the right and thereby cause the friction disk 13 to engage the worm wheel 8.

A brake application valve device is provided comprising a casing 16 having a piston chamber 17 containing a piston 18 and a valve chamber 19 containing a slide valve 20 adapted to be operated by piston 18. The operation of piston 18 is effected by venting fluid under pressure from piston chamber 17 through the operation of a vent valve 21 contained in a valve chamber 22 which is connected to piston chamber 17 through pipe 23.

The usual brake pipe 24 leads to the seat of slide valve 20 and when the slide valve 20 is moved to the left, said pipe is connected through cavity 25 with an exhaust port 26, so that the brake pipe pressure is then reduced and an application of the brakes is thereby effected in the usual manner.

A lever arm 27 is provided for operating the valve 21 and said arm is pivotally connected to one end of a connecting rod 28, the other end of said rod being pivotally connected to the friction disk 13. One end of the lever arm 27 is adapted to engage the stem of the valve 21 and the other end is provided with a member 29 adapted to engage a cam 30 carried by and rotating with the pinion 6. A spring 31 acts on the lever arm 27 and, through the rod 28, normally maintains the friction disk 13 in the position shown in the drawing.

For controlling the apparatus in accordance with the signal indication, a magnet valve device is provided comprising a magnet 32 and valves 33 and 34 adapted to be controlled by said magnet. When the train is operating under a clear signal indication, the magnet 32 is energized, so that the valve 33 is held closed and the valve 34 is held open. Fluid under pressure is then supplied from a fluid supply pipe 35 past the open valve 34 to pipe 36 which leads to the seat of application slide valve 20. The valve chamber 19 of the application valve device is supplied with fluid under pressure from pipe 37 and with piston 18 in release position, as shown in the drawing, fluid equalizes through a feed groove 38 around piston 18 to piston chamber 17.

In the release position of slide valve 20, pipe 36 is connected through a cavity 39 in slide valve 20 with a pipe 40 which leads to piston chamber 11, so that when the train is running in a clear block, fluid under pressure is supplied to piston chamber 11 and the piston 10 is thereby maintained in the position shown, with the friction disk 13 out of engagement with the worm wheel 8.

If the traffic conditions should change, the magnet 32 will be deenergized and this will cause the valve 34 to be seated and the valve 33 to unseat. Fluid under pressure will then be vented from pipe 36 to the exhaust port 41 and also from piston chamber 11, so that spring 14 acts to shift the piston 10 and the rod 9 to the right, causing the friction disk 13 to engage the worm wheel 8. The worm wheel 8 is continually rotating with the governor drive shaft 3 at a speed proportional to the speed of the train, so that when the friction disk 13 engages the worm wheel, said disk will also be rotated at the same speed, the extent of rotation, however, being limited by the engagement of a pin 42 carried by the rod 9 with a stop 43 carried by the end of the casing 12, such rotative movement being about one-half of a revolution.

The pinion 6 is rotated according to the speed of the train and the consequent extent of the longitudinal movement of the rod 4 and the cam 30 is correspondingly rotated. The operation of the arm 27 by the rotation of the disk 13 to open the valve 21 depends upon the engagement of the member 29 on the cam 30, since the cam acts as a fulcrum for the lever arm 27, and it will be evident that the higher the speed of the train, the greater the extent of rotation of the pinion 6 and the cam 30 and the lesser distance the member 29 must move before it engages the cam. When the member 29 engages the cam 30, the cam acts as a fulcrum for the arm 27, so that further movement of the lever arm 27 by the further rotation of the disk 13 will cause the lever arm to engage the stem of the valve 21 and open the valve so as to vent fluid under pressure from the piston chamber 17.

When fluid is vented from piston chamber 17, the piston 18 is shifted to its outer position in which the cavity 25 in slide valve 20 connects the brake pipe 24 with exhaust port 26, so that fluid is vented from the brake pipe to effect an application of the brakes in the usual manner.

In the application position of slide valve 20, a port 44 registers with pipe 40, so that fluid under pressure is supplied from valve chamber 19 to pipe 40 and the piston chamber 11. The piston 10 is then shifted to its outer position, causing disengagement of the friction disk 13 with the worm wheel 8. The pin 42 is then shifted out of engagement with the stop 43 and the spring 31 acts through the rod 28 to return the disk 13 to its normal position, as shown in the drawing.

In application position, a passage 45, leading to piston chamber 17, is connected through cavity 46 in slide valve 20 with pipe 36, so that piston chamber 17 will be maintained at atmospheric pressure, so long as the magnet 32 remains deenergized with the valve 33 open. When the magnet 32 is again energized, the valve 33 will be seated and the valve 34 unseated, so as to supply fluid under pressure to piston chamber 17 and thereby effect the movement of piston 18 to release position.

Having now described my invention, what I claim as new and desire to secure by Letters Patent, is:—

1. In a train control device, the combination with means for effecting an application of the brakes, of mechanism movable at a speed proportional to the speed of the train for operating said brake applying means, and means movable according to the speed of the train for influencing the movement of said mechanism to determine the time period before said brake applying means is actuated by said mechanism.

2. In a train control device, the combination with a valve and means controlled by said valve for effecting an application of the brakes, of mechanism set in motion upon a change in the signal indication and including a member adapted to engage said valve and a cam positioned according to the speed of the train and adapted to act as a fulcrum for said member to cause said member to operate said valve.

3. In a train control device, the combination with a valve and means controlled by said valve for effecting an application of the brakes, of a member movable to engage said valve, means movable at a speed proportional to the speed of the train for moving said member, a cam acting as a fulcrum for said member, and means operated according to the speed of the train for determining the fulcrum position of said cam.

4. In a train control device, the combination with a valve and means controlled by said valve for effecting an application of the brakes, of a member for operating said valve, a rotatable element operatively connected to said member, mechanism rotating at a speed proportional to the speed of the train, and means operating upon a change in the signal indication for operatively connecting said element to said mechanism.

5. In a train control device, the combination with a valve and means controlled by said valve for effecting an application of the brakes, of a member for operating said valve, a rotatable element operatively connected to said member, a cam movable to different positions according to the speed of the train and engageable by said member, mechanism rotating at a speed proportional to the speed of the train, and means operating upon a change in the signal indication for operatively connecting said element to said mechanism.

6. In a train control device, the combination with means for effecting an application of the brakes and mechanism operating upon a change in the signal indication for operating said means, of means for delaying the operation of said brake applying means for a period of time inversely proportional to the speed of the train, and means for reducing said time period, the higher the speed of the train.

7. In a train control device, the combination with means for effecting an application of the brakes, of slow acting mechanism for controlling the operation of said means, a clutch device, and means operated upon a change in the signal indication for operating said clutch device to cut said mechanism into action.

8. In a train control device, the combination with a brake application valve device, of slow acting mechanism for controlling the operation of said valve device, means operating upon a change in the signal indication for operating said clutch device to cut said mechanism into action and means controlled by said valve device for operating said clutch device to cut said mechanism out of action.

9. In a train speed control device, the combination with means for effecting an application of the brakes, of a rotating member, mechanism for operating said means and including a rotatable member, and means operated upon a change in the signal indication for operatively connecting said members.

10. In a train speed control device, the combination with means for effecting an application of the brakes, of a rotating member, mechanism for operating said means and including a rotatable member, means operated upon a change in the signal indication for operatively connecting said members, and means operated according to the speed of the train for varying the time interval of said mechanism.

In testimony whereof I have hereunto set my hand.

CLYDE C. FARMER.